(12) United States Patent
Lawton et al.

(10) Patent No.: US 7,704,417 B2
(45) Date of Patent: Apr. 27, 2010

(54) HEATED MOLD TOOLING

(75) Inventors: Bruce E. Lawton, Rochester, NY (US); Stephen P. Johnston, Ashville, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 117 days.

(21) Appl. No.: 12/043,643

(22) Filed: Mar. 6, 2008

(65) Prior Publication Data

US 2009/0224417 A1    Sep. 10, 2009

(51) Int. Cl.
*B29D 11/00* (2006.01)
(52) U.S. Cl. ......................... 264/2.1; 264/2.5
(58) Field of Classification Search .................. 264/2.1, 264/2.5
See application file for complete search history.

(56) References Cited

U.S. PATENT DOCUMENTS

| 4,364,878 A | 12/1982 | Laliberte et al. | |
| 5,181,053 A | 1/1993 | Brown | |
| 5,540,410 A | 7/1996 | Lust et al. | |
| 5,545,366 A | 8/1996 | Lust et al. | |
| 5,702,735 A * | 12/1997 | Martin et al. | 425/548 |
| 6,869,549 B2 | 3/2005 | Ansell et al. | |
| 2007/0132120 A1 * | 6/2007 | Rastogi et al. | 264/1.1 |

* cited by examiner

*Primary Examiner*—Maria Veronica D Ewald
*Assistant Examiner*—Robert J Grun
(74) *Attorney, Agent, or Firm*—John E. Thomas

(57) ABSTRACT

A method for varying a radius of an optical quality surface of a casting mold formed in a tooling cavity, the tooling cavity at least partially defined by an optical tool having an optical quality surface of a given radius, includes imparting a compressive stress within the optical quality surface of the casting mold to predictably decrease the radius of the optical quality surface of the casting mold.

24 Claims, 5 Drawing Sheets

HEATED MOLD TOOLING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to equipment used in the manufacture of ophthalmic device molds, and, in particular, to equipment used in the manufacture of contact lens molds.

2. Description of Related Art

Soft hydrogel contact lenses have increased in popularity since they were first introduced in the 1970s. Such contact lenses are conventionally formed through a process in which the material used to make the lenses is placed between two halves of a casting mold, i.e., an anterior mold half and a posterior mold half. The mold halves are assembled to retain a volume of curable liquid, which is then cured to form the desired contact lens shape.

The anterior and posterior mold halves used to form the contact lenses are typically formed from polymers such as, for example, polystyrene or polypropylene, and are manufactured through a molding process. In forming the mold halves, molten polystyrene is typically provided, via an extrusion system, to a plurality of mold inserts in a mold forming apparatus. For example, a convex portion of a mold insert forms an optical quality surface on a concave surface of the anterior mold half. The concave optical surface of the anterior mold half can then be used to form the convex (anterior) optical surface of a contact lens. Similarly, a concave portion of an additional apparatus insert may form an optical quality surface on a convex surface of the posterior mold half. The convex optical surface of the posterior mold half can then be used to form the concave (posterior) optical surface of the contact lens.

As shown in U.S. Pat. No. 5,702,735 to Martin et al. ("the '735 patent"), an apparatus for manufacturing contact lens mold halves includes a number of mold cavities and a system for providing molten lens material to the cavities. The components of the apparatus that define the optical quality surfaces of the mold halves include a hollow cylindrical bushing and a removable insert mounted therein. In the manufacturing process, the insert is changed out so that the prescription strength of the contact lens formed by the resulting mold halves may be varied Although the apparatus illustrated in the '735 patent may form contact lens mold halves, such an apparatus can be difficult and time consuming to use due to variations inherent to the molding process. For example, in order to manufacture contact lens mold halves of a desired radius, a matrix of step tools must be used to setup the apparatus. First, a nominal step tool is used to produce a batch of baseline molds. The baseline molds are measured for accuracy, and a series of step changes must then be made until the desired dimensions are achieved in the resulting mold halves. The apparatus must be shut down in order to change out the step tools, and multiple step changes are often required during setup. In addition, because each step tool includes an optical quality surface, the tools are very time consuming and expensive to produce.

Accordingly, the disclosed system and method are directed towards overcoming one or more of the problems set forth above.

SUMMARY OF THE INVENTION

In an exemplary embodiment of the present disclosure, a method for varying a radius of an optical quality surface of a casting mold formed in a tooling cavity, the tooling cavity at least partially defined by an optical tool having an optical quality surface of a given radius, includes imparting a compressive stress within the optical quality surface of the casting mold to predictably decrease the radius of the optical quality surface of the casting mold.

In another exemplary embodiment of the present disclosure, a method for varying a radius of an optical quality surface of a casting mold formed in a tooling cavity, the tooling cavity at least partially defined by an optical tool having an optical quality surface of a given radius, includes imparting a tensile stress within the optical quality surface of the casting mold to predictably increase the radius of the optical quality surface of the casting mold.

In a further exemplary embodiment of the present disclosure, a method of forming polymeric casting molds in a tooling cavity, the tooling cavity at least partially defined by an optical tool having an optical quality surface of a given radius, includes forming a first casting mold having an optical quality surface radius smaller than the given radius. The method further includes forming a second casting mold having an optical quality surface radius greater than the given radius.

In another exemplary embodiment of the present disclosure, a method for varying a radius of an optical quality surface of a casting mold formed in a tooling cavity, the tooling cavity at least partially defined by an optical tool having an optical quality surface of a given radius, includes increasing a cooling rate of injected polymeric material adjacent the optical quality surface of the optical tool to impart a compressive stress in the optical quality surface of the casting mold and to decrease the radius of the optical quality surface in the casting mold.

In still another exemplary embodiment of the present disclosure, a casting mold configured to form an ophthalmic device having an optical quality surface includes an optical quality surface and a circumscribing flange. The optical quality surface of the casting mold includes a residual compressive stress, the residual compressive stress decreasing a radius of the optical quality surface.

In yet another exemplary embodiment of the present disclosure, a casting mold configured to form an ophthalmic device having an optical quality surface includes an optical quality surface and a circumscribing flange. The optical quality surface of the casting mold includes a residual tensile stress, the residual tensile stress increasing a radius of the optical quality surface.

In still another exemplary embodiment of the present disclosure, a tooling cavity configured to form a polymeric casting mold includes a tool body and an optical tool removably connected to the tool body, the optical tool defining an optical quality surface of a given radius. The tooling cavity further includes a non-optical tool configured to assist in forming a radius forming portion opposite the optical quality surface.

The tooling cavity also includes a heat source connected to the tool body and configured to selectively heat a portion of the optical quality surface.

DETAILED DESCRIPTION OF THE DRAWINGS

Figure 1:
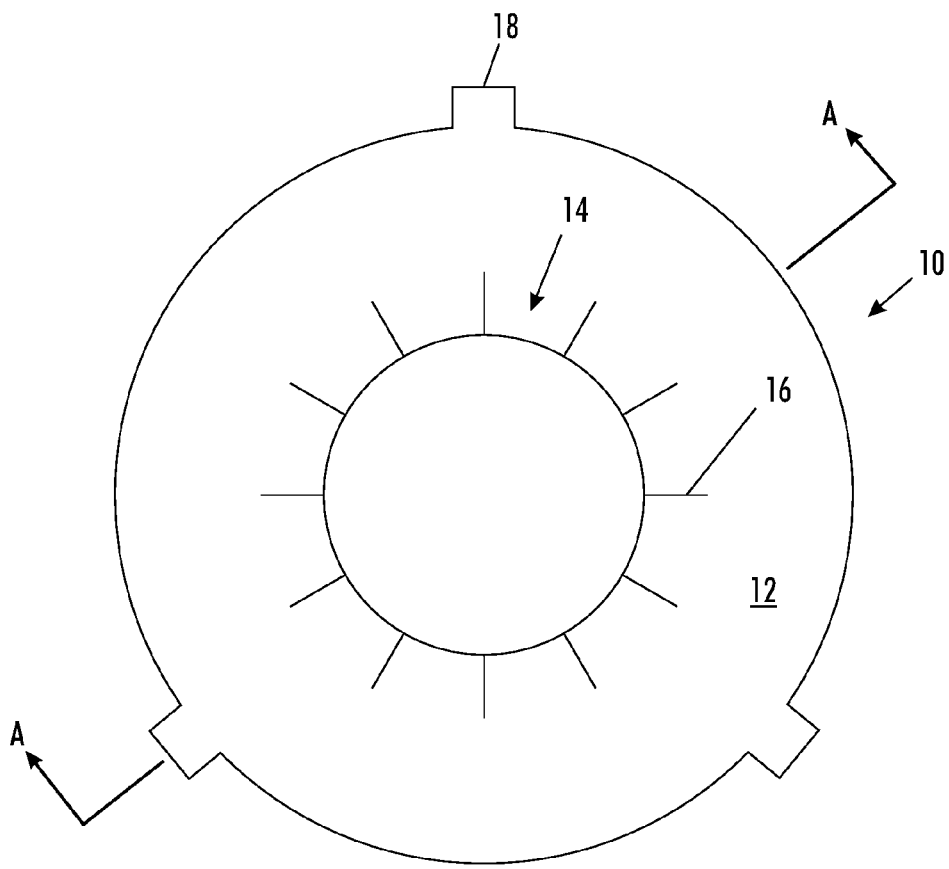
FIG. 1 is a top view of a posterior mold half according to an exemplary embodiment of the present disclosure.

FIG. 1 illustrates a posterior mold half 10 according to an exemplary embodiment of the present disclosure. The posterior mold half 10 can be formed from any rubber, plastic, polymer, and/or any other composite material known in the art. For example, in an exemplary embodiment of the present disclosure, the posterior mold half 10 can be made and/or otherwise formed from polypropylene, polystyrene, and/or any other like polymer. This posterior mold half 10 can have any desirable thickness known in the art and can be molded into any shape suitable for forming a corresponding ophthalmic device. As will be discussed in greater detail below, the posterior mold half 10 and an anterior mold half 20 (FIG. 2) of the present disclosure can be produced in a tooling cavity 77 of an apparatus 76 (FIGS. 4 and 5) such as, for example, a thermoformer or other like manufacturing device. Together, the posterior mold half 10 and anterior mold half 20 can form a casting mold for forming ophthalmic devices such as, for example, contact lenses.

The posterior mold half 10 can be substantially circular, substantially square, substantially rectangular, and/or any other shape known in the art to be suitable for the formation of ophthalmic devices. For example, as illustrated in FIG. 1, the posterior mold half 10 can be substantially disc-shaped, and the flange 12 can be disposed radially about a bowl 14 defined by the posterior mold half 10. As shown in FIG. 1, the flange 12 can circumscribe a convex optical quality surface 38 defined by the bowl 14 and, thus, the flange 12 can be substantially annular in shape. In an exemplary embodiment, the flange 12 can be disposed adjacent to the optical quality surface 38 of the posterior mold half 10.

A plurality of fins 16 can be disposed substantially radially about the bowl 14. The fins 16 can extend substantially perpendicular to the flange 12 and a portion of each fin 16 may be disposed adjacent to the optical quality surface 38 of the posterior mold half 10. The fins 16 may be configured to assist in positioning the posterior mold half 10 relative to the anterior mold half 20 when forming, for example, an ophthalmic device. For example, as will be discussed later with respect to FIG. 3, a portion of the anterior mold half 20 may be configured to accept the plurality of fins 16 during an ophthalmic device forming process. Each of the fins 16 may be substantially the same shape and/or size and, in an exemplary embodiment, the fins 16 may be substantially square, substantially rectangular, and/or any other shape known in the art to be suitable for assisting in supporting and/or positioning the posterior mold half 10 relative to the anterior mold half 20 during an ophthalmic device forming process.

Figure 4:
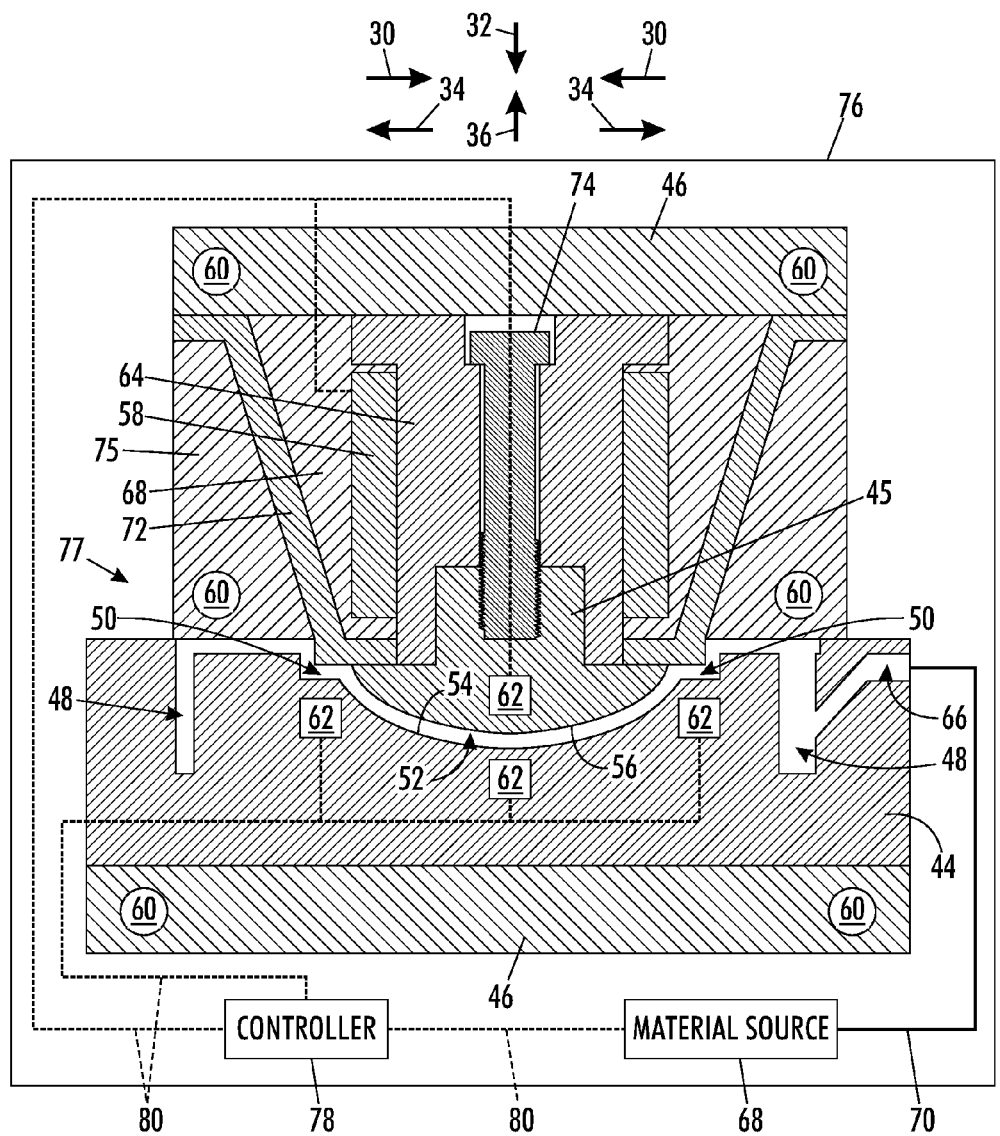
FIG. 4 is a diagrammatic illustration of an apparatus for forming an anterior mold half according to an exemplary embodiment of the present disclosure.
Figure 5:
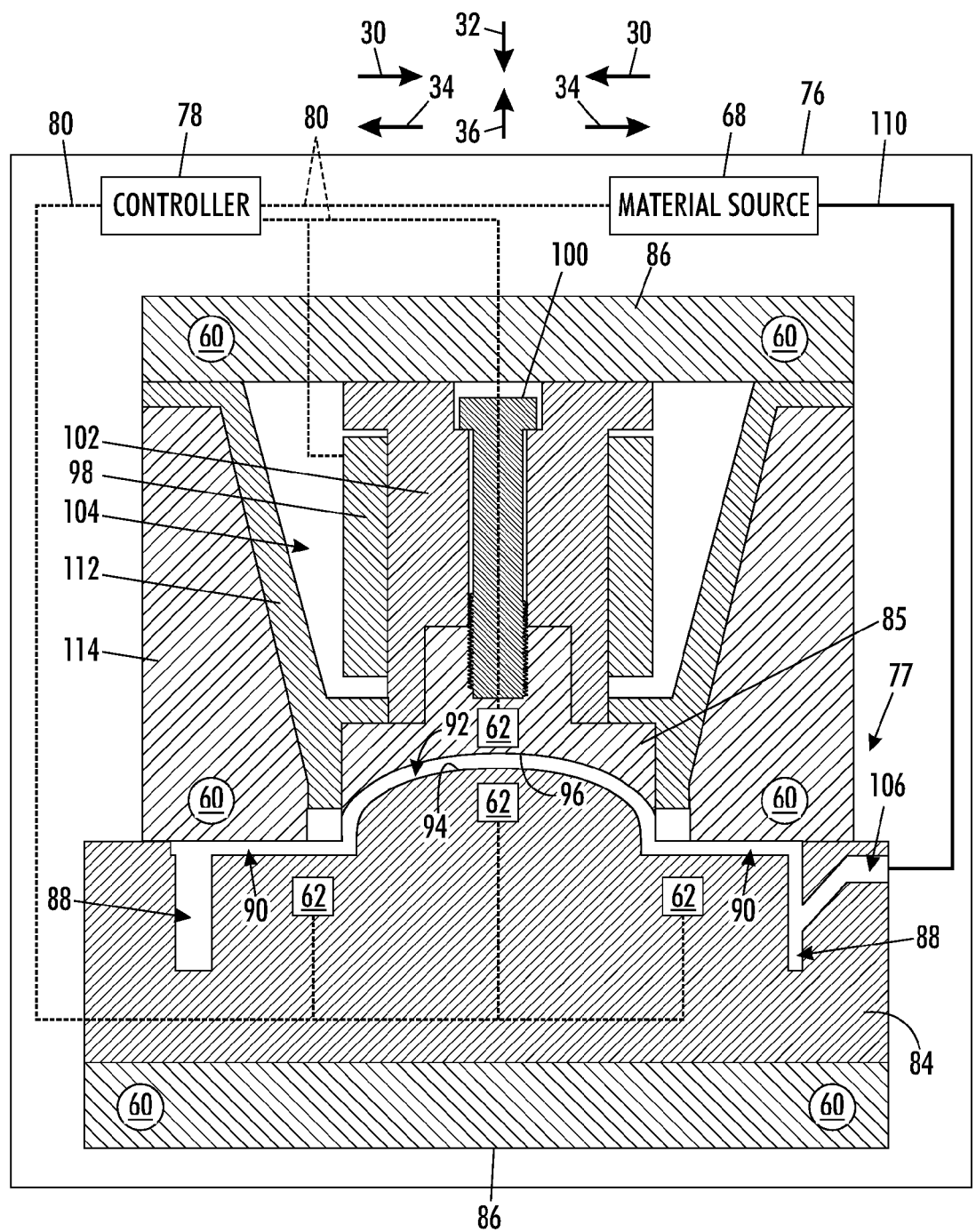
FIG. 5 is a diagrammatic illustration of an apparatus for forming a posterior mold half according to an exemplary embodiment of the present disclosure.

The posterior mold half 10 can also include a plurality of legs 18 extending substantially perpendicular to the flange 12. The legs 18 can assist in positioning the posterior mold half 10 with respect to the anterior mold half 20 during an ophthalmic device forming process. The legs 18 may also assist in removing the posterior mold half 10 from, for example, a tooling cavity 77 of the apparatus 76 (FIGS. 4 and 5). The legs 18 can also be vestiges of the molten material used to form the posterior mold half 10.

The optical quality surface 38 of the posterior mold half 10 can be substantially semi-circular in shape, and/or any other shape or configuration known in the art to be suitable for assisting in forming an ophthalmic device. The bowl 14 may be substantially hollow and, as illustrated in FIGS. 1 and 1a, the optical quality surface 38 defined thereby can be substantially bowl-shaped.

Figure 1A:
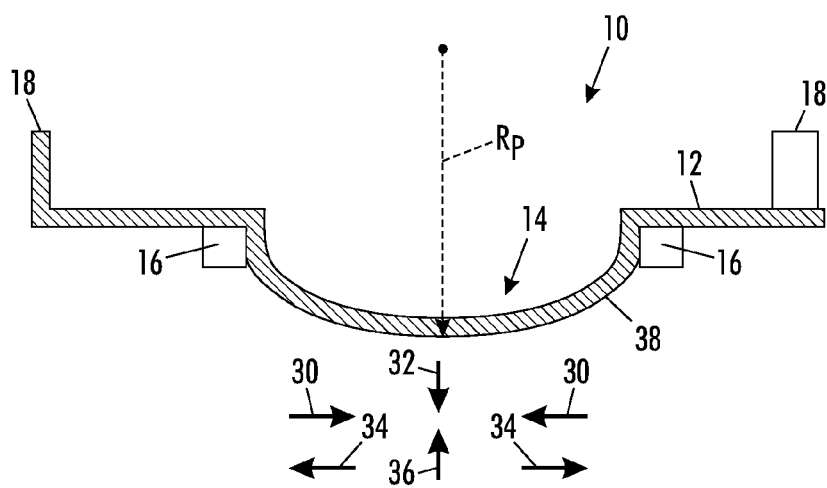
FIG. 1a is a cross-sectional view of the posterior mold half illustrated in FIG. 1.

FIG. 1a is a cross-sectional view of the posterior mold half 10 as seen from the line A-A of FIG. 1. As shown in FIG. 1a, the optical quality surface 38 defines a radius $R_P$ of the posterior mold half 10. Applying a compressive stress in the direction of arrows 30, within the optical quality surface 38 of the posterior mold half 10, causes a deflection of the optical quality surface 38 in the direction of arrow 32 and a corresponding decrease in the radius $R_P$ of the optical quality surface 38. Likewise, applying a tensile stress in the direction of arrows 34 causes a deflection of the optical quality surface 38 in the direction of arrow 36 and a corresponding increase in the radius $R_P$ of the optical quality surface 38.

Figure 2:
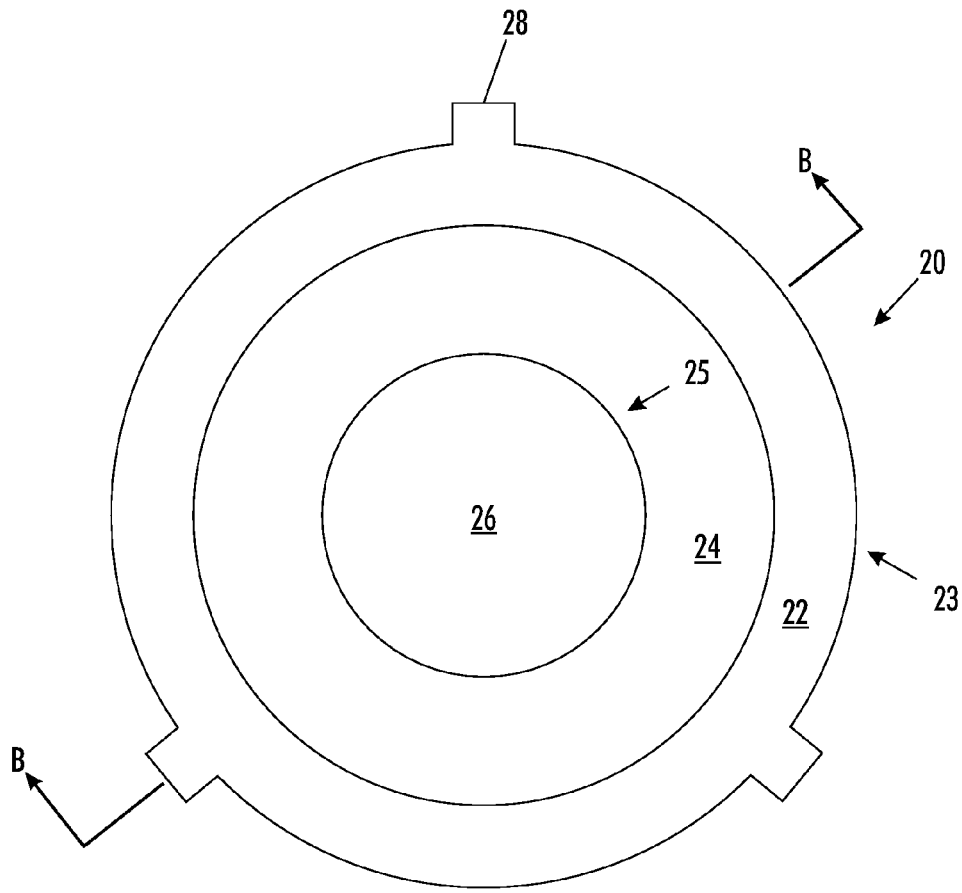
FIG. 2 is a top view of an anterior mold half according to an exemplary embodiment of the present disclosure.

FIG. 2 illustrates the anterior mold half 20 according to an exemplary embodiment of the present disclosure. As described above with respect to the posterior mold half 10, the anterior mold half 20 can include, for example, a flange 23 and a bowl 25 defining a convex optical quality surface 26 adjacent to the flange 23. The anterior mold half 20 can be made from any of the materials discussed above with respect to the posterior mold half 10 and, in an exemplary embodiment, the anterior mold half 20 may be made from a polymer such as, for example, polyethylene or polystyrene. The anterior mold half 20 may be any shape known in the art to be suitable for use in molding an ophthalmic device and, in an exemplary embodiment, the anterior mold half 20 may be substantially disc-shaped as discussed above with respect to the posterior mold half 10.

The flange 23 can be defined by an outer shelf 22 and an inner shelf 24. An exemplary embodiment of the outer shelf 22 and inner shelf 24 is further illustrated in FIG. 2a. The outer shelf 22 can be disposed substantially adjacent to the inner shelf 24, and the inner shelf 24 can circumscribe the optical quality surface 26 and/or be substantially annular in configuration. The outer shelf 22 may be substantially parallel to the inner shelf 24 and, as discussed above, together the inner shelf 24 and outer shelf 22 can assist in substantially defining the flange 23 of the anterior mold half 20.

The anterior mold half 20 can also include one or more legs 28. As shown in FIG. 2, in an exemplary embodiment, the anterior mold half 20 may include three legs 28. It is understood, however, that in an additional exemplary embodiment, the anterior mold half 20 may include more than or less than three legs 28. The legs 28 may assist in, for example, removing the anterior mold half 20 from the apparatus 76 (FIGS. 4 and 5), and the legs 28 of the anterior mold half 20 can be substantially similar in nature and configuration to the legs 18 of the posterior mold half 10 illustrated in FIG. 1. As with the posterior mold half 10, the legs 28 of the anterior mold half 20 can be vestiges of the molten material used in the forming process.

The optical quality surface 26 can be similar in shape and/or configuration to the optical quality surface 38 of the posterior mold half 10. In an exemplary embodiment, the optical quality surface 26 can be substantially semi-circular and/or substantially bowl-shaped, and the optical quality surface 26 may be configured to assist in molding an ophthalmic device such as, for example, a contact lens.

Figure 2A:
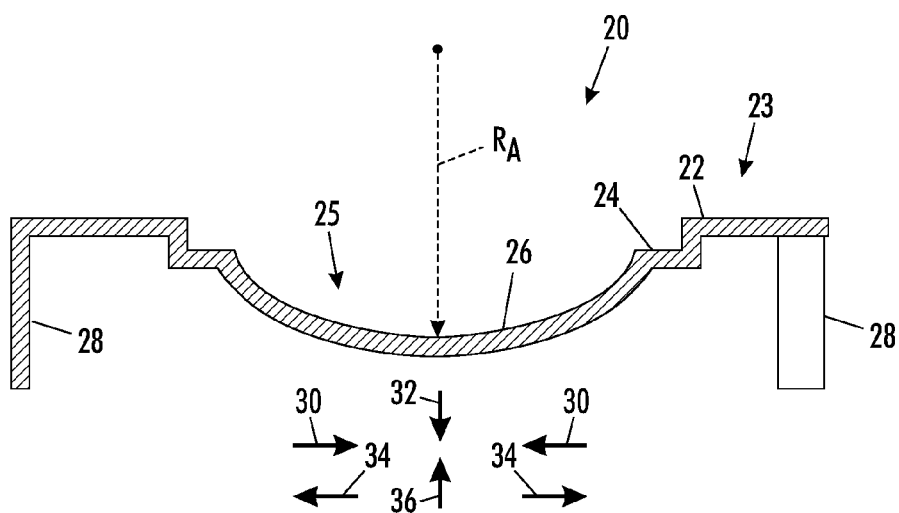
FIG. 2a is a cross-sectional view of the anterior mold half illustrated in FIG. 2.

FIG. 2a is a cross-sectional view of the anterior mold half 20 as seen from the line B-B of FIG. 2. As shown in FIG. 2a, a radius $R_A$ of the optical quality surface 26 of the anterior mold half 20. Imparting a compressive stress within the optical quality surface 26 of the anterior mold half 20 in the direction of arrows 30, causes a deflection of the optical quality surface 26 in the direction of arrow 32. A deflection in the direction of arrow 32 of the optical quality surface 26 causes a corresponding decrease in the radius $R_A$ of the optical quality surface 26. Likewise, imparting a tensile stress within the optical quality surface 26 in the direction of arrows 34, causes a corresponding deflection of the optical quality surface 26 in the direction of arrow 36. Such a deflection may cause an increase in the radius $R_A$ of the optical quality surface 26.

Figure 3:
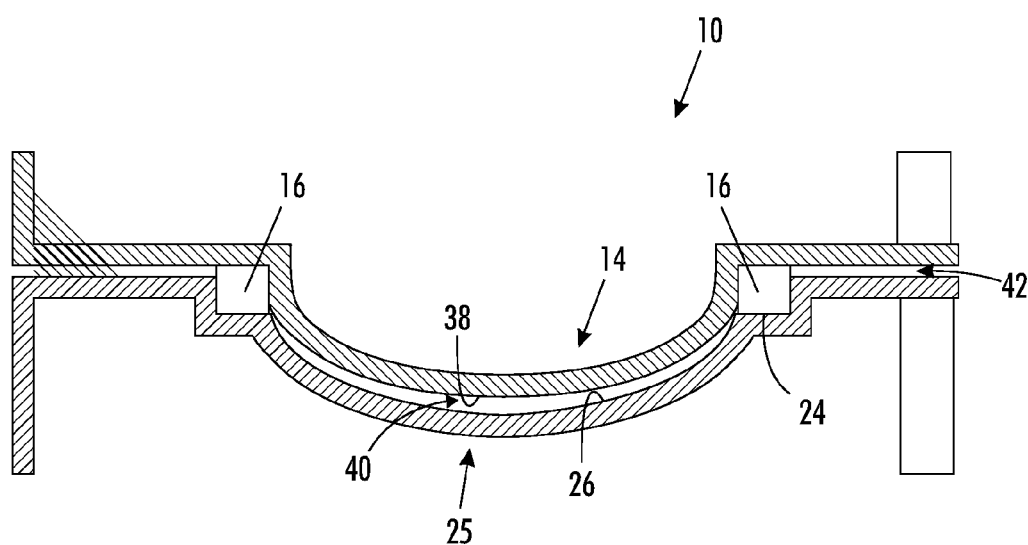
FIG. 3 is a cross-sectional view of the posterior and anterior mold halves of FIGS. 1 and 2, respectively.

As shown in FIG. 3, the posterior mold half 10 is configured to mate with the anterior mold half 20. In an exemplary embodiment, the fins 16 of the posterior mold half 10 are configured to mate with the shoulder between the inner shelf 24 and the outer shelf 22 of the anterior mold half 20. The mated relationship between the fins 16 and the shoulder assist in, for example, positioning the posterior mold half 10 relative to the anterior mold half 20 in an ophthalmic device forming process.

As shown in FIG. 3, when the posterior mold half 10 is mated with the anterior mold half 20, the mold halves 10, 20 define a forming cavity 40 disposed between the optical quality surface 38 of the posterior mold half 10 and the optical quality surface 26 of the anterior mold half 20. The forming cavity 40 can be generally substantially semi-circular and generally be configured to define an ophthalmic device. When the posterior mold half 10 is mated with the anterior mold half 20, the mold halves 10, 20 may also define a gap 42 disposed substantially between the flange 12 of the posterior mold half 10 and the flange 23 of the anterior mold half 20. In particular, the gap 42 can be disposed between the flange 12 and the outer shelf 22 of the flange 23. The gap 42 can be sized and/or otherwise configured to assist in separating the posterior mold half 10 from the anterior mold half 20 after an exemplary ophthalmic device forming process. For example, an implement can be inserted in the gap 42 to assist in prying the posterior mold half 10 from the anterior mold half 20 after an ophthalmic device has been formed by the mold halves 10, 20.

FIGS. 4 and 5 illustrate an exemplary apparatus 76 for forming a casting mold such as, for example, the posterior mold half 10 and anterior mold half 20 discussed above. As shown in FIGS. 4 and 5, an exemplary tooling cavity 77 of the apparatus 76 is configured to form both the posterior mold half 10 and the anterior mold half 20. The portion of the tooling cavity 77 illustrated in FIG. 4 can be configured to mold and/or otherwise form the anterior mold half 20 illustrated in FIG. 2 and the portion of the tooling cavity 77 illustrated in FIG. 5 can be configured to form and/or otherwise mold the posterior mold half 10 illustrated in FIG. 1. It is understood that the tooling cavity 77 of the apparatus 76 can be configured to form and/or otherwise mold a plurality of mold halves during a casting mold forming process. For ease of description, similar parts of the portions of the tooling cavity 77 illustrated in FIGS. 4 and 5 will be described below in unison.

The components of the tooling cavity 77 can be made from stainless steel, aluminum, cast iron, copper alloys, ceramic metals, and/or any other thermally conductive metal and/or alloy known in the art. For example, components of the tooling cavity 77 may be made from molten ceramic metal that is poured or otherwise deposited within a desirably shaped die or mold and then machined to finished form. Alternatively, portions of the tooling cavity 77 may be made from beryllium copper that is machined, finished, and/or otherwise formed to have any configuration useful in forming, for example, the posterior mold half 10 and anterior mold half 20 of the present disclosure.

The tooling cavity 77 can include, for example, a tool body 64, 102 and a heat source 58, 98 connected thereto. The tool body 64, 102 may comprise a substantially rigid structure configured to conductively transfer heat from the heat source 58, 98 to another structure. The tool body 64, 102 can be made from any of the materials discussed above with respect to the tooling cavity components and, in an exemplary embodiment, the tool body 64, 102 can be made from a copper alloy or a ceramic metal. The tool body 64, 102 can be any shape, size, and/or other configuration known in the art and, as illustrated in FIGS. 4 and 5, the tool body 64, 102 may be substantially cylindrical and/or substantially hollow. In addition, a portion of the tool body 64, 102 can be threaded to accept a bolt, screw, or other connection mechanism.

The heat source 58, 98 can comprise, for example, a heating plate, a glow plug, an electric heater, and/or any other heat source known in the art. The heat source 58, 98 can be connected to the tool body 64, 104 and can be configured to conductively transfer heat to the tool body 64, 102. As discussed above, the tool body 64, 102 can be configured to conductively transfer heat from the heat source 58, 98 to other tooling cavity components and, in an exemplary embodiment, the tool body 64, 102 can be configured to conductively transfer heat to an optical tool 45, 85 of the tooling cavity 77. The heat transferred to tooling cavity components can assist in, for example, imparting compressive and/or tensile stress to casting molds formed by the apparatus 76.

In an exemplary embodiment, the heat source at 58, 98 can be positioned and or otherwise configured to selectively heat the tool body 64, 102 and/or the optical tool 45, 85. By selectively heating the tool body 64, 102 and/or the optical tool 45, 85, the heat source 58, 98 transmits heat and/or otherwise elevates the temperature of only the tool body 64, 102 and/or the optical tool 45, 85, and imparts substantially no or materially less heat energy to other components of the tooling cavity 77. The tooling cavity 77 can define a gap 68, 104 between the heat source 58, 98 and the other tooling cavity components to assist in substantially eliminating any heat transfer from the heat source 58, 98 to these other components. In addition, the other components can be formed from non-thermally conductive or substantially less-conductive materials to further assist in rejecting heat given off by, for example, the heat source 58, 98. Examples of such non-thermally conductive materials can include any copper alloy such as, for example, CuNiSn and BeCu.

In an exemplary embodiment, the heat source 58, 98 can be configured to selectively heat at least a portion of an optical quality surface 56, 96 of the optical tool 45, 85 to a desired temperature. The heat source 58, 98 can be configured to assist in maintaining the optical quality surface 56, 96 at the desired temperature for a desired period of time so as to assist in forming and/or molding a polymeric casting mold. In an exemplary embodiment, the desired temperature may be maintained within a range of approximately 100° Fahrenheit to approximately 500° Fahrenheit. Such a range can allow for a relatively large radial change in the optical surface 56, 96. Maintaining the optical quality surface 56, 96 at the desired temperature may assist in desirably varying and/or desirably modifying, for example, the radius $R_P$, $R_A$ of the optical quality surface 38, 26 of the respective mold halves formed in the tooling cavity 77.

The optical tool 45, 85 can be made from the same materials discussed above with respect to components of the tooling cavity 77. For example, the optical tool 45, 85 can be made from beryllium copper or any other thermally conductive metal, alloy, or ceramic metal. The optical tool 45, 85 may be removably connected to the tool body 64, 102 via one or more connectors 74, 100. The connector 74, 100 can be, for example, a bolt, a screw, a clamp, and/or any other like connection structure known in the art. The connector 74, 100 can engage the tool body 64, 102, with the optical tool 45, 85 in a way typical for machine tooling. In addition, the connector 74, 100 can engage the tool body 64, 102, with the optical tool 45, 85 such that at least a portion of the optical tool 45, 85 can be selectively heated through the conductive transfer of heat from the tool body 64, 102 to the optical tool 45, 85 during a thermoforming process.

The optical quality surface 56, 96 of the optical tool 45, 85 can assist in defining a radius forming portion 52, 92 between the optical tool 45, 85 and a non-optical tool 44, 84 of the tooling cavity 77. In particular, the radius forming portion 52, 92 can be defined by the optical quality surface 56, 96 of the optical tool 45, 85 and a non-optical quality surface 54, 94 of the non-optical tool 44, 84. The optical quality surfaces 56, 96 can be machined, dimensioned, and/or otherwise configured to assist in forming a desirable radius on the optical quality surface 38, 26 of the respective mold halves 10, 20 (FIGS. 1a and 2a). In an exemplary embodiment, the optical quality surface 56, 96 can be machined to a desired radius with a tolerance of approximately 2 microns. The optical quality surface 56 of the optical tool 45 can be substantially convex and the optical quality surface 96 of the optical tool 85 can be substantially concave.

The tooling cavity 77 can also include components configured to assist in forming, for example, the flange 12, 23 and legs 18, 28 of the casting mold discussed above (FIGS. 1a and 2a). For example, the tooling cavity 77 can further include a core 72, 112 and/or a stripper 75, 114. The core 72, 112 can be connected to the optical tool 45, 85 via one or more connectors 74, 100 (not shown), or any other known connection means, so as to assist in thermally isolating the optical tool 45, 85 and/or substantially hindering heat transfer between the optical tool 45, 85 and other components of the tooling cavity 77. The core 72, 112 can be made from any of the materials discussed above with respect to the tooling cavity components and may also be formed from substantially rigid thermally non-conductive materials. The core 72, 112 can be made from, for example, stainless steel, aluminum, cast iron, copper alloys, ceramic metals, and/or any other thermally conductive metal and/or alloy known in the art.

The core 72, 112 can be any shape and/or configuration known in the art, and a portion of the core 72, 112 can assist in defining a flange forming portion 50, 90 between the portion of the core 72, 112 and the non-optical tool 44, 84. The flange forming portion 50, 90 can be disposed adjacent to the radius forming portion 52, 92 and the flange forming portion 50, 90 can be substantially circular so as to extend substantially radially around the radius forming portion 52, 92. In an exemplary embodiment of the present disclosure, the flange forming portion 50 can assist in forming at least a portion of, for example, the inner shelf 24 and/or the outer shelf 22 of the flange 23 (FIG. 2a). Likewise, the flange forming portion 90 can assist in forming at least a portion of, for example, the flange 12 of the posterior mold half 10 (FIG. 1a).

The stripper 75, 14 can be formed from any of the materials discussed above with respect to the core 72, 112 and can be configured to further assist in substantially limiting heat transfer between, for example, the optical tool 45, 85 and the other components of the tooling cavity 77. The stripper 75, 14 can be connected to, for example, the core 72, 112 via one or more connectors 74, 100 (not shown) and can be configured to further assist in defining the flange forming portion 50, 90. A portion of the stripper 75, 114 can also be shaped and/or otherwise configured to assist in defining a leg forming portion 48, 88 between the portion of the stripper 75, 114 and the non-optical tool 44, 84. The leg forming portion 48 illustrated in FIG. 4 can assist in forming at least a portion of the legs 28 of the anterior mold half 20 and the leg forming portion 88 illustrated in FIG. 5 can assist in forming at least a portion of the legs 18 of the posterior mold half 10. The leg forming portion 48, 88 may be disposed adjacent to the flange forming portion 50, 90, and the leg forming portion 48, 88 can extend substantially perpendicular to the flange forming portions 50, 90.

The non-optical tool 44, 84 can be configured to assist in forming the radius forming portion 52, 92, the flange forming portion 50, 90, and the leg forming portion 48, 88 discussed above. The optical tool 45, 85 can be made from the same materials discussed above with respect to components of the tooling cavity 77. For example, the non-optical tool 44, 84 can be made from beryllium copper or any other thermally conductive metal, alloy, or ceramic metal. The non-optical tool 44, 84 can be removably connected to the tooling cavity 77 via one or more of the connectors 74, 100 discussed above in a way typical for machine tooling.

The non-optical quality surface 54, 94 of the non-optical tool 44, 84 can be machined, dimensioned, and/or otherwise configured to assist in forming the respective mold halves 10, 20 (FIGS. 1a and 2a). In an exemplary embodiment, the non-optical quality surface 54 of the non-optical tool 44 can be substantially concave and the non-optical quality surface 94 of the non-optical tool 84 can be substantially convex. In addition, at least a portion of the leg forming portion 48, 88 and/or the flange forming portion 50, 90 can be machined into and/or otherwise defined by the non-optical tool 44, 84. The non-optical tool 44, 84 can be configured to mate with, for example, the optical tool 45, 85, the core 72, 112, and/or the stripper 75, 114 during a casting mold forming process. When so mated, a desired distance and/or spacing can be maintained between, for example, the optical quality surface 56, 96 and the respective non-optical quality surface 54, 94. In addition, when so mated, the optical tool 45, 85 can be configured to desirably impart compressive and/or tensile stress to a polymeric material disposed within the radius forming portion 52, 92 of the tooling cavity 77. For example, it is understood that creating a temperature differential across the polymeric material disposed within the radius forming portion 52, 92 (caused by a controlled temperature differential between the optical tool 45, 85 and the non-optical tool 44, 84 or other tooling cavity components) can lead to a controlled difference in the rate at which the mold halves 10, 20 cool. These differences in the rate of cooling can lead to the formation of residual stresses within the mold halves 10, 20. Such stresses can cause a controlled amount of deformation within the mold halves 10, 20 to affect the ultimate radius of the mold halves 10, 20.

The tooling cavity 77 can also include one or more additional heat sources 116, 118 configured to assist in heating at least a portion of the flange forming portion 50, 90. As discussed above with respect to the heat source 58, 98, the heat source 116, 118 can be, for example, a heating plate, a glow plug, an electric heater, and/or any other heat source known in the art, and the heat source 116, 118 can assist in electrically and/or conductively heating polymeric material disposed in at least the flange forming portion 50, 90 to a desired temperature. The heat source 116, 118 can be substantially the same shape and/or configuration as the flange forming portion 50, 90. For example, in an embodiment of the present disclosure, the heat source 116, 118 can be disposed within the non-optical tool 44, 84 and can be substantially annular so as to match the substantially annular shape of the flange forming portion 50, 90. In addition, although not illustrated as such in FIG. 4, it is understood that the heat source 116 can include one or more angled portions so as to substantially match the profile of the inner shelf 24 and outer shelf 24 of the anterior mold half 20. In such an exemplary embodiment, the non-optical tool 44, 84 can be configured to desirably impart compressive and/or tensile stress to a polymeric material disposed within, for example, the radius forming portion 52, 92 of the tooling cavity 77. Changing the cooling rate of portions of the molten polymeric material by selectively activating the heat sources 58, 60, 116, 118 discussed above, assists in imparting compressive or tensile stress within the casting mold formed in the tooling cavity 77.

For example, it is understood that for some materials, such as semi-crystalline materials, changing the rate of cooling alone is enough to change the rate of material shrinkage. As the cooling rate of such materials is increased, the amount of shrinkage experienced by such materials decreases. Simply changing the rate of cooling observed by mold halves made from such materials can effect the percent shrinkage of the mold halves. Thus, creating a temperature differential across the polymeric material disposed within the radius forming portion 52, 92 by selectively activating the heat sources 58, 60 can lead to a controlled difference in the rate at which the mold halves 10, 20 cool. These differences in the rate of cooling can lead to the formation of residual compressive or tensile stresses within the mold halves 10, 20. Such stresses can cause a controlled amount of deformation within the mold halves 10, 20 to affect the ultimate radius of the mold halves 10, 20.

The tooling cavity 77 can also include one or more components configured to monitor and/or sense a temperature of a portion of the tooling cavity 77. For example, the optical tool 45, 85 can include a heat sensor 62 configured to sense a temperature of the optical quality surface 56, 96. The heat sensor 62 can be any conventional heat sensing device known in the art such as, for example, a thermocouple. The heat sensor 64 can be disposed within the optical tool 45, 85 proximate the optical quality surface 56, 96 so as to detect a temperature of a polymeric material disposed within the radius forming portion 52, 92 during a casting mold forming process. In addition, as illustrated in FIGS. 4 and 5, the non-optical tool 44, 84 can include a plurality of heat sensors 62 positioned and/or otherwise configured to sense a temperature of a polymeric material disposed within the radius forming portion 52, 92 and/or the flange forming portion 50, 90 during a casting mold forming process.

In an exemplary embodiment, the tooling cavity 77 can include one or more cooling plates 46, 67, 86, 108. An exemplary cooling plate 46, 86 can be connected to the tool body 64, 102 and/or the core 72, 112 via one or more connectors 74, 100 (not shown) or other connection means. An exemplary cooling plate 67, 108 can also be connected to the non-optical tool 44, 84 via one or more connectors 74, 100 (not shown) or other connection means. The cooling plate can be any structure known in the art to be useful in conductively cooling a component to which it is connected an/or otherwise dissipating heat therefrom. In an exemplary embodiment, the cooling plate 46, 67, 86, 108 can comprise a radiator or other like device. The cooling plate 46, 67, 86, 108 can define one or more passages 60 configured to direct coolant therethrough for assisting in cooling components connected to the cooling plate 46, 67, 86, 108. The coolant can be, for example, water, oil, ethylene glycol, and/or any other coolant known in the art. In an exemplary embodiment, the cooling plate 46, 67, 86, 108 can be fluidly connected to a coolant source (not shown) and a pump (not shown) configured to direct a flow of the coolant through the passages 60. In an exemplary embodiment, the coolant can be between approximately 50 degrees Fahrenheit and approximately 80 degrees Fahrenheit. The cooling plate 46, 67, 86, 108 can be configured to assist in increasing the cooling rate of components of the tooling cavity 77 such as, for example, the non-optical tool 44, 84 and can, thus, assist in increasing the cooling rate of molten polymeric material disposed within, for example, the leg forming portion 48, 88, the radius forming portion 52, 92, and/or the flange forming portion 50, 90 during a casting mold forming process. As discussed above, changing the cooling rate of portions of the molten polymeric assists in imparting compressive or tensile stress within the casting mold formed in the tooling cavity 77.

The stripper 75, 114 can also define one or more passages 60 fluidly connected to a coolant source (not shown) and configured to assist in increasing the cooling rate of material or components of the tooling cavity 77. Thus, the stripper 75, 114 can also be configured to assist in increasing the cooling rate of molten polymeric material disposed within, for example, the leg forming portion 48, 88, the radius forming portion 52, 92, and/or the flange forming portion 50, 90 during a casting mold forming process.

The apparatus 76 can also include a controller 78. The controller 78 can be any type of controller known in the art configured to assist in manipulating and/or otherwise controlling a group of electrical and/or electromechanical devices. For example, the controller 78 can include an ECU, a computer, and/or any other electrical control device known in the art. The controller 78 can include one or more operator interfaces such as, for example, a monitor, a keyboard, a mouse, a touch screen, and/or any other devices useful in entering, reading, storing, and/or extracting data from the devices to which the controller 78 is connected. The controller 78 can be configured to exercise one or more control algorithms and/or control the devices to which it is connected based on one or more preset programs. For example, the controller 78 can be configured to control the heat sources 58, 98, 116, 118 to assist in forming, for example, the posterior mold half 10 and the anterior mold half 20 of the present disclosure. The controller 78 can also be configured to store and/or collect data regarding the formation of the posterior mold half 10 and the anterior mold half 20. Such data can include, for example, temperature, pressure, time, and/or any other quantifiable sensed parameter of the casting mold formation process.

As shown in FIGS. 4 and 5, the controller 78 can be connected to the heat sources 58, 98, 116, 118 via connection lines 80. The controller 78 may also be connected to the heat sensors 62 via connection lines 80. The connection lines 80 may consist of any conventional electrical connection means known in the art such as, for example, wires or other like connection structures as well as wireless communication means. Through these electrical connections, the controller 78 can be configured to receive sensed temperature data from each of the heat sensors 62. In particular, the controller 78 can be configured to receive sensed temperature data representing the temperature of, for example, the optical quality surface 56, 96 of the optical tool 45, 85, the non-optical quality surface 54, 94 of the non-optical tool 44, 84, and the temperature of the non-optical tool 44, 84 proximate the flange forming portion 50, 90. Based on the sensed temperature data received, the controller 78 can also be configured to control the heat sources 58, 116, 98, 118 in order to increase and/or decrease the temperature of, for example, polymeric material disposed within, the flange forming portion 50, and the radius forming portion 52.

The apparatus 76 can also include a material source 68. The material source 68 may be a component configured to provide a flow of molten material to the tooling cavity 77 and the material source 68 can include, for example, an extruder or other like machine. In an exemplary embodiment, the material source 68 can be configured to direct a flow of molten polymer such as, for example, polystyrene to a portion of the tooling cavity 77. The material source 68 can be connected to the tooling cavity 77 by, for example, a material line 70, 110. The material line 70, 110 can be any channel or material flow line capable of directing a flow of molten polymer from the material source 68 to the tooling cavity 77. In an exemplary embodiment, the material line 70, 110 can be connected to a channel 66, 106 of the tooling cavity 77. In an exemplary embodiment, at least a portion of the channel 66, 106 can be defined by the non-optical tool 44, 84. The channel 66, 106 can be configured to direct the molten polymer provided by the material source 68 to, for example, the leg forming portion 48, 88, the flange forming portion 50, 90, and/or the radius forming portion 52, 92 of the tooling cavity 77. Alternatively, the material line 70, 110 can be omitted. In such an exemplary embodiment, the material source 68 can be connected directly to the channel 66, 106 of the tooling cavity 77. Although not illustrated in FIGS. 4 and 5, it is understood that the material source 68 can include, for example, a resin mixer, a die, and/or any other conventional extruder or material source components known in the art.

INDUSTRIAL APPLICABILITY

The apparatus 76 of the present disclosure can be used with a series of other machines for the formation of polymeric casting molds. The apparatus can be configured and/or otherwise included in, for example, an assembly line used to manufacture polymeric casting molds for molding and/or otherwise manufacturing ophthalmic devices such as, for example, contact lenses. In an exemplary embodiment, the apparatus 76 can be configured to form a posterior mold half 10 and an anterior mold half 20 useful in forming ophthalmic devices having a desired radius. In particular, the apparatus 76 can be configured to assist in varying a radius of an optical quality surface of a casting mold formed in the tooling cavity 77 thereof without requiring a corresponding change in tooling having an optical quality surface defining a portion of the tooling cavity.

When forming a casting mold according to an exemplary embodiment of the present disclosure, the material source 68 can direct a flow of molten polymeric material through material line 70 and into the channel 66. The molten polymeric material can substantially fill the flange forming portion 50, 90, the leg forming portion 48, 88, and the radius forming portion 52, 92. In particular, the molten polymeric material can contact the non-optical quality surface 54, 94 and the optical quality surface 56, 96, and can be substantially shaped thereby. Once the molten polymeric material has filled the flange forming portion 50, 90, the leg forming portion 48, 88, and the radius forming portion 52, 92, the optical quality surface 56, 96 of the optical tool 45, 85 may begin to form the corresponding optical quality surface 26, 38 of the casting mold formed thereby.

The optical quality surface 38, 26 of the casting mold is the portion of the casting mold configured to impart and/or otherwise form a radius of an ophthalmic device such as, for example, a contact lens. In particular, the optical quality surface 38 of the posterior mold half 10 can form the radius of the posterior side of a contact lens and the optical quality surface 26 of the anterior mold half 20 may form the radius of the anterior side of the same contact lens. The posterior and anterior radii of the resulting contact lens define the power of the contact lens. Thus, the radii of the optical quality surfaces 56, 96 of the optical tools 45, 85 control the radii, and the final power, of the ophthalmic device formed by the resulting casting mold.

One or more parameters of the apparatus 76 can be adjusted and/or modified to adjust and/or vary the radius $R_P$, $R_A$ of the optical quality surface 38, 26 of the casting mold formed thereby. For example, the apparatus 76 can impart a compressive stress within the optical quality surface 38, 26 of the casting mold to predictably decrease the radius $R_P$, $R_A$ of the optical quality surface 38, 26 of the casting mold. In such an embodiment, the apparatus 76 can be controlled to increase, relative to the flange 12, 23, a cooling rate of the polymeric material adjacent to the optical quality surface 38, 26 of the casting mold to impart the compressive stress. In order to increase the cooling rate of the polymeric material adjacent to the optical quality surface 38, 26, the temperature of the polymeric material disposed within, for example, the flange forming portion 50, 90 can be increased by activating the heat source 16, 118. Increasing the temperature of the material disposed within the flange forming portion 50, 90 can cause the material disposed within the radius forming portion 52, 92 to cool faster than the material disposed therein, thereby imparting a compressive stress thereto. As discussed above, imparting compressive stress within the optical quality surface 38, 26 of the casting mold deflects the optical quality surface 38, 26 in the direction of arrow 32, and a corresponding decrease in the radius $R_P$, $R_A$.

The cooling plates 46, 86, 67, 108 and/or the passages 60 of the stripper 75, 114 can also be configured to assist in increasing, relative to the flange 12, 23, the cooling rate of the polymeric material adjacent to the optical quality surface 38, 26 of the casting mold. In an exemplary embodiment, a flow of coolant can be directed proximate the portion of the tooling cavity 77 containing the polymeric material to be cooled. The coolant can conductively cool the portion of the cooling cavity 77 and, thus, can assist in conductively cooling the polymeric material.

The compressive stress discussed above can also be imparted within the optical quality surface 38, 26 of the casting mold by, for example, increasing a cooling rate of a portion of the optical quality surface 56, 96 of the optical tool 45, 85 relative to a portion of the tooling cavity 77, such as, for example, the flange forming portion 50, 90. As discussed above, this can be accomplished by selectively heating the flange forming portion 50, 90 of the tooling cavity 77, and/or directing a flow of coolant proximate the optical quality surface 38, 26 of the casting mold. The temperature of a portion of the optical tool 45, 85, such as, for example, the optical quality surface 56, 96, can be sensed during the formation of the casting mold and, in particular, as the apparatus 76 imparts the compressive stress to the optical quality surface 38, 26 thereof. The flange forming portion 50, 90 of the tooling cavity 77 can be selectively heated based on the sensed temperature.

The components of the apparatus 76 can also be configured to vary the radius $R_P$, $R_A$ of the optical quality surface 38, 26 of the casting mold by imparting a tensile stress within the optical quality surface 38, 26 to predictably increase the radius $R_P$, $R_A$ of the optical quality surface 38, 26. In an exemplary embodiment, once a molten polymeric material has been provided by the material source 68 to fill, for example, the leg forming portion 48, 88, flange forming portion 50, 90, and radius forming portion 52, 92 of the tooling cavity 77, a cooling rate of the polymeric material adjacent to the optical quality surface 38, 26 can be decreased relative to the flange 12, 23 to impart tensile stress. The temperature of the polymeric material disposed within, for example, the radius forming portion 52, 92 can be increased by activating the heat source 58, 98. Activating the heat source 58, 98 can assist in decreasing the cooling rate of the polymeric material disposed in the radius forming portion 52, 92 relative to the material disposed within the flange forming portion 50, 90. In particular, a cooling rate of a portion of the optical quality surface 56, 96 of the optical tool 45, 85 can be decreased to assist in imparting tensile stress thereto.

The temperature of the polymeric material disposed within, for example, the flange forming portion 50, 90 can be decreased to further assist in imparting tensile stress within the optical quality surface 38, 26. In an exemplary embodiment, a flow of coolant can be directed proximate the flange forming portion 50, 90 via the cooling plates 46, 86, 67, 108 and/or the passages 60 of the stripper 75, 114 to assist in decreasing, relative to the flange 12, 23, the cooling rate of the polymeric material adjacent to the optical quality surface 38, 26 of the casting mold.

Imparting tensile stress to the optical quality surface 38, 26 can also include sensing a temperature of a portion of the optical tool 45, 85 with a heat sensor 62 disposed therein. For example, the heat sensor 62 disposed proximate the optical quality surface 56, 96 can sense the temperature thereof and provide information representing the sensed temperature to the controller 78. A portion of the optical quality surface 56, 96 of the optical tool 45, 85 can then be selectively heated based on the sensed temperature.

In a further exemplary embodiment, the apparatus 76 may be used to form similarly shaped casting molds having different radii. For example, the optical tool 45 illustrated in FIG. 4 has an optical quality surface 56 of a given radius, and the radius of the optical quality surface 56 remains substantially constant throughout the formation of the casting mold 20. However, the apparatus 76 may be used to form a first casting mold 20 having an optical quality surface radius $R_A$ that is smaller than the radius of the optical quality surface 56.

Casting mold forming parameters of the apparatus 76 such as, for example, the temperature of the optical quality surface 56, the dwell time of the molten casting mold material, and/or the cooling rate of the optical quality surface 56, can then be modified. For example, the controller 78 can activate the heat source 58 connected to the tool body 64, or the heat source 16 disposed within the non-optical tool 44, to increase the temperature of polymeric material disposed within the radius forming portion 52 or the flange forming portion 50, respectively. A flow of coolant can also be directed proximate the flange forming portion 50 or the radius forming portion 52 to decrease the temperature of polymeric material disposed within the flange forming portion 50 or the radius forming portion 52, respectively. The apparatus 76 can then be used to form a second casting mold having an optical quality surface radius $R_A$ that is greater than the given radius of the optical quality surface 56 of the optical tool 45.

In forming the first and second casting molds discussed above, the cooling rate of a portion of the optical quality surface 56 of the optical tool 45 can be selectively modified based on a cooling rate of a portion of the tooling cavity 77, such as, for example, the flange forming portion 50. In addition, in forming the first and second casting molds, a temperature of the flange forming portion 58 of the tooling cavity 77 can be selectively modified by, for example, energizing and/or otherwise activating the heat source 60 disposed proximate thereto. It is understood that a compressive stress can be imparted within the optical quality surface 26 of the first casting mold discussed above, and imparting such compressive stress can assist in predictably decreasing the optical quality surface radius $R_A$ of the first casting mold. Similarly, a tensile stress can be imparted within the optical quality surface 26 of the second casting mold discussed above, and imparting this tensile stress may assist in predictably increasing the optical quality surface radius $R_A$ of the second casting mold. A temperature of a portion of the optical tool 45 such as, for example, the optical quality surface 56 can be sensed during the formation of the first and second casting molds, and the temperature of either the portion of the optical tool 45 and the flange forming portion 50 of the tooling cavity 77 can be modified based on the sensed temperature.

As discussed above, the compressive stress imparted to the optical quality surface 38, 26 of the casting mold can cause deflection of the radius $R_P$, $R_A$ in the direction of arrow 32 and a corresponding decrease in the radius $R_P$, $R_A$ of the optical quality surface 38, 26. Likewise, imparting a tensile stress within the optical quality surface 38, 26 of the casting mold can cause a deflection in the direction of arrow 36 and a corresponding increase in the radius $R_P$, $R_A$ of the optical quality surface 38, 26. The resulting casting mold and, in particular, the optical quality surface 38, 26 can have a residual compressive stress or a residual tensile stress based on the selective heating of portions of the casting mold as discussed above. The residual compressive stress of the optical quality surface 26 can assist in decreasing the radius $R_P$, $R_A$ and the residual tensile stress can assist in increasing the radius $R_P$, $R_A$. In particular, creating a temperature differential across the polymeric material disposed within the radius forming portion 52, 92 (caused by a controlled temperature differential between the optical tool 45, 85 and the non-optical tool 44, 84 or other tooling cavity components) can lead to a controlled difference in the rate at which the mold halves 10, 20 cool. These differences in the rate of cooling can lead to the formation of residual stresses within the mold halves 10, 20. Such stresses can cause a controlled amount of deformation within the mold halves 10, 20 to affect the ultimate radius of the mold halves 10, 20. For example, as the cooling rate is increased, the percent shrinkage of the resulting mold halves 10, 20 decreases.

Other embodiments of the disclosed apparatus 76 will be apparent to those skilled in the art from consideration of this specification. It is intended that the specification and examples be considered as exemplary only, with the true scope of the invention being indicated by the following claims.

What is claimed is:

1. A method for varying a radius of an optical quality surface of a casting mold formed in a tooling cavity, the tooling cavity at least partially defined by an optical tool having an optical quality surface of a given radius, the method comprising:

imparting a compressive stress within the optical quality surface of the casting mold to predictably decrease the radius of the optical quality surface of the casting mold which further comprises increasing a cooling rate of a portion of the optical quality surface of the optical tool relative to a portion of the tooling cavity.

2. The method of claim 1, further comprising forming an annular flange circumscribing the optical quality surface of the casting mold and increasing, relative to the flange, a cooling rate of a polymeric material adjacent the optical quality surface of a given radius to impart the compressive stress.

3. The method of claim 1, wherein the optical quality surface of the casting mold is one of convex and concave.

4. The method of claim 1, wherein the optical quality surface is a convex surface of a posterior mold half.

5. The method of claim 1, wherein the optical quality surface is a concave surface of an anterior mold half.

6. A method for varying a radius of an optical quality surface of a casting mold formed in a tooling cavity, the tooling cavity at least partially defined by an optical tool having an optical quality surface of a given radius, the method comprising:

imparting a compressive stress within the optical quality surface of the casting mold to predictably decrease the radius of the optical quality surface of the casting mold which further comprises selectively heating a flange forming portion of the tooling cavity.

7. The method of claim 6, wherein the flange forming portion extends radially around the optical quality surface of the optical tool.

8. The method of claim 6, wherein the optical quality surface is a convex surface of a posterior mold half.

9. The method of claim 6, wherein the optical quality surface is a concave surface of an anterior mold half.

10. A method for varying a radius of an optical quality surface of a casting mold formed in a tooling cavity, the tooling cavity at least partially defined by an optical tool having an optical quality surface of a given radius, the method comprising:

imparting a compressive stress within the optical quality surface of the casting mold to predictably decrease the radius of the optical quality surface of the casting mold which further comprises sensing a temperature of a portion of the optical tool.

11. The method of claim 10, further comprising selectively heating a flange forming portion of the tooling cavity based on the sensed temperature.

12. The method of claim 10, further comprising forming an annular flange circumscribing the optical quality surface of the casting mold and increasing, relative to the flange, a cooling rate of a polymeric material adjacent the optical quality surface of a given radius to impart the compressive stress.

13. The method of claim 10, wherein the optical quality surface is a convex surface of a posterior mold half.

14. The method of claim 10, wherein the optical quality surface is a concave surface of an anterior mold half.

15. A method for varying a radius of an optical quality surface of a casting mold formed in a tooling cavity, the tooling cavity at least partially defined by an optical tool having an optical quality surface of a given radius, the method comprising:

increasing a cooling rate of injected polymeric material adjacent the optical quality surface of the optical tool to impart a compressive stress in the optical quality surface of the casting mold and to decrease the radius of the optical quality surface in the casting mold; and increasing a cooling rate of a portion of the optical quality surface of the optical tool relative to a portion of the tooling cavity.

16. The method of claim 15, wherein the optical quality surface is a convex surface of a posterior mold half.

17. The method of claim 15, wherein the optical quality surface is a concave surface of an anterior mold half.

18. A method for varying a radius of an optical quality surface of a casting mold formed in a tooling cavity, the tooling cavity at least partially defined by an optical tool having an optical quality surface of a given radius, the method comprising:

increasing a cooling rate of injected polymeric material adjacent the optical quality surface of the optical tool to impart a compressive stress in the optical quality surface of the casting mold and to decrease the radius of the optical quality surface in the casting mold; and selectively heating a flange forming portion of the tooling cavity disposed adjacent to the optical tool.

19. The method of claim 18, wherein the flange forming portion extends radially around the optical quality surface of the optical tool.

20. The method of claim 18, wherein the optical quality surface is a convex surface of a posterior mold half.

21. The method of claim 18, wherein the optical quality surface is a concave surface of an anterior mold half.

22. A method for varying a radius of an optical quality surface of a casting mold formed in a tooling cavity, the tooling cavity at least partially defined by an optical tool having an optical quality surface of a given radius, the method comprising:

increasing a cooling rate of injected polymeric material adjacent the optical quality surface of the optical tool to impart a compressive stress in the optical quality surface of the casting mold and to decrease the radius of the optical quality surface in the casting mold; and sensing a temperature of a portion of the optical tool and selectively heating a portion of the tooling cavity adjacent to the optical tool based on the sensed temperature.

23. The method of claim 22, wherein the optical quality surface is a convex surface of a posterior mold half.

24. The method of claim 22, wherein the optical quality surface is a concave surface of an anterior mold half.

* * * * *